(12) United States Patent
Peebles

(10) Patent No.: US 10,351,283 B2
(45) Date of Patent: Jul. 16, 2019

(54) MAGNETICALLY OPERATED SEALING BAR ASSEMBLY FOR PACKAGING MACHINES

(71) Applicant: KHS USA, INC, Sarasota, FL (US)

(72) Inventor: Donald Scott Peebles, Bradenton, FL (US)

(73) Assignee: KHS USA, INC., Sarasota, FL (US)

( * ) Notice: Subject to any disclaimer, the term of this patent is extended or adjusted under 35 U.S.C. 154(b) by 634 days.

(21) Appl. No.: 14/972,746

(22) Filed: Dec. 17, 2015

(65) Prior Publication Data

US 2017/0174377 A1 Jun. 22, 2017

(51) Int. Cl.
*B65B 51/26* (2006.01)
*B65B 9/08* (2012.01)
*B29C 65/00* (2006.01)
*B29C 65/18* (2006.01)

(52) U.S. Cl.
CPC .......... *B65B 51/26* (2013.01); *B29C 66/1122* (2013.01); *B29C 66/431* (2013.01); *B29C 66/81463* (2013.01); *B29C 66/8244* (2013.01); *B29C 66/83221* (2013.01); *B29C 66/849* (2013.01); *B29C 66/8432* (2013.01); *B65B 9/08* (2013.01); *B29C 65/18* (2013.01); *B29C 66/73921* (2013.01); *B29C 66/8167* (2013.01); *B29C 66/8242* (2013.01); *B29C 66/8412* (2013.01)

(58) Field of Classification Search
CPC ......... B65B 51/26; B65B 51/30; B29C 65/18; B29C 66/43

USPC .......... 53/562, 373.7, 555; 156/272.2, 583.1
See application file for complete search history.

(56) References Cited

U.S. PATENT DOCUMENTS

| 2,953,882 | A | * | 9/1960 | Tew | B65B 9/2014 |
| | | | | | 53/525 |
| 2,982,334 | A | | 5/1961 | Cooper et al. | |
| 3,665,673 | A | * | 5/1972 | Billett | B29C 66/849 |
| | | | | | 53/228 |
| 4,348,851 | A | * | 9/1982 | Prakken | B29C 65/7451 |
| | | | | | 53/507 |

(Continued)

FOREIGN PATENT DOCUMENTS

| DE | 2743315 | 4/1979 |
| GB | 579147 | 2/1945 |

(Continued)

*Primary Examiner* — Gloria R Weeks
(74) *Attorney, Agent, or Firm* — Allen Dyer Doppelt & Gilchrist PA

(57) ABSTRACT

A sealing bar assembly for a packaging machine includes a mounting frame, first and second sealing bar carriages carried by the mounting frame, at least one of the first and second sealing bars being movable with respect to the mounting frame, first and second sealing bars mounted, respectively, to the first and second sealing bar carriages and movable therewith, the first and second bars including, respectively, first and second opposed sealing surfaces, at least a first electromagnet assembly arranged adjacent to the first sealing bar, and a controller configured to selectively energize the first electromagnet assembly to move the first and second opposed sealing surfaces into and out of engagement across a web of packaging material passing therebetween.

23 Claims, 3 Drawing Sheets

(56) References Cited

U.S. PATENT DOCUMENTS

| | | | | |
|---|---|---|---|---|
| 4,423,585 | A * | 1/1984 | Monsees | B65B 9/2028 53/389.5 |
| 4,608,797 | A * | 9/1986 | Shabram, Jr. | B65B 51/30 53/504 |
| 4,743,337 | A * | 5/1988 | Moran | B29C 65/18 100/219 |
| 4,757,668 | A * | 7/1988 | Klinkel | B29C 65/02 53/374.6 |
| 4,779,397 | A * | 10/1988 | Christine | B65B 61/186 53/133.2 |
| 5,606,844 | A * | 3/1997 | Takagaki | B29C 65/08 53/133.2 |
| 5,976,312 | A * | 11/1999 | Shimizu | H01L 21/6708 118/730 |
| 6,195,967 | B1 * | 3/2001 | Todd | B29C 65/18 53/139.2 |
| 6,212,861 | B1 * | 4/2001 | Tsuruta | B29C 65/18 53/374.6 |
| 6,421,987 | B1 * | 7/2002 | Fukuda | B29C 65/18 53/371.6 |
| 7,328,544 | B2 * | 2/2008 | Yokota | B65B 9/207 53/167 |
| 7,484,347 | B2 * | 2/2009 | Konno | B29C 65/3656 53/373.7 |
| 8,317,922 | B2 * | 11/2012 | Lee | C23C 14/12 118/715 |
| 2001/0008064 | A1 * | 7/2001 | Todd | B29C 66/0342 53/455 |
| 2003/0221773 | A1 | 12/2003 | Jones | |
| 2004/0140044 | A1 * | 7/2004 | Rassi | B65B 9/026 156/157 |
| 2006/0064945 | A1 * | 3/2006 | Kammler | B29C 65/18 53/479 |
| 2007/0017189 | A1 * | 1/2007 | Konno | B29C 65/3656 53/551 |
| 2008/0092492 | A1 * | 4/2008 | Konno | B26D 7/22 53/477 |
| 2010/0180545 | A1 * | 7/2010 | Palmquist | B29C 65/3656 53/285 |
| 2011/0185681 | A1 * | 8/2011 | Ansinn | B29C 65/18 53/452 |
| 2012/0279181 | A1 * | 11/2012 | Gkinosatis | B32B 27/08 53/443 |
| 2013/0019568 | A1 * | 1/2013 | Gkinosatis | B65B 51/303 53/450 |
| 2013/0227916 | A1 * | 9/2013 | Gkinosatis | B29C 66/83241 53/469 |
| 2014/0075884 | A1 * | 3/2014 | Sighinolfi | B29C 65/3656 53/373.7 |
| 2018/0312284 | A1 * | 11/2018 | Ternes | B65B 51/227 |
| 2018/0326626 | A1 * | 11/2018 | Gray | B29C 44/182 |

FOREIGN PATENT DOCUMENTS

| | | |
|---|---|---|
| JP | 64039212 | 9/1989 |
| NL | 1031167 | 10/2007 |

* cited by examiner

MAGNETICALLY OPERATED SEALING BAR ASSEMBLY FOR PACKAGING MACHINES

FIELD OF THE INVENTION

The present invention relates to packaging machines, and more particularly, to sealing bar assemblies used in connection therewith.

BACKGROUND OF THE INVENTION

Sealing bars are widely used in the packaging industry. For example, pouching machines will frequently employ sealing bars to form hermetic seals along the edges of a pouch during the pouch-forming process and to close the formed pouch after filling. Sealing bars may also be adapted to include plastic zipper seals and other fitments into pouches and other packages.

When operating sealing bars, evenly distributed and properly aligned application of sealing forces is often critical to proper operation. If sealing bars are misaligned or apply pressure unequally over the length of the seal, problems ranging from an undesirable finished appearance to package failure may result. Consequently, sealing bars are typically mounted on extremely robust and heavy frames that will not flex or misalign during application of sealing forces. While such sealing bar assemblies have proven effective, further improvements are possible.

SUMMARY OF THE INVENTION

In view of the foregoing, it is an object of the invention to provide an improved sealing bar assembly and related methods. According to an embodiment of the present invention, a sealing bar assembly for a packaging machine includes a mounting frame, first and second sealing bar carriages carried by the mounting frame, at least one of the first and second sealing bars being movable with respect to the mounting frame, first and second sealing bars mounted, respectively, to the first and second sealing bar carriages and movable therewith, the first and second bars including, respectively, first and second opposed sealing surfaces, at least a first electromagnet assembly arranged adjacent to the first sealing bar, and a controller configured to selectively energize the first electromagnet assembly to move the first and second opposed sealing surfaces into and out of engagement across a web of packaging material passing therebetween.

According to an aspect of the invention, the first and/or second electromagnet assemblies include, respectively, first and second pairs of electromagnets. According to another aspect to the electromagnets of each pair are positioned adjacent opposite ends of the sealing bars along the sealing axis.

According to a further aspect, one or more load cells are associated with the electromagnet assemblies to sense the force exerted therebetween. Advantageously, the controller is further configured to use the sensed force in controlling the energization of the electromagnetic assemblies.

According to an additional aspect, the sealing bar assembly includes a mode adjustment assembly configured to engage the first and second sealing bar carriages to vary a fully open spacing between the first and second opposed sealing surfaces from an operational mode spacing to a stop mode spacing greater than the operational mode spacing.

These and other objects, aspects and advantages of the present invention will be better appreciated in view of the drawings and following detailed description of preferred embodiments.

DETAILED DESCRIPTION OF PREFERRED EMBODIMENTS

Figure 1:
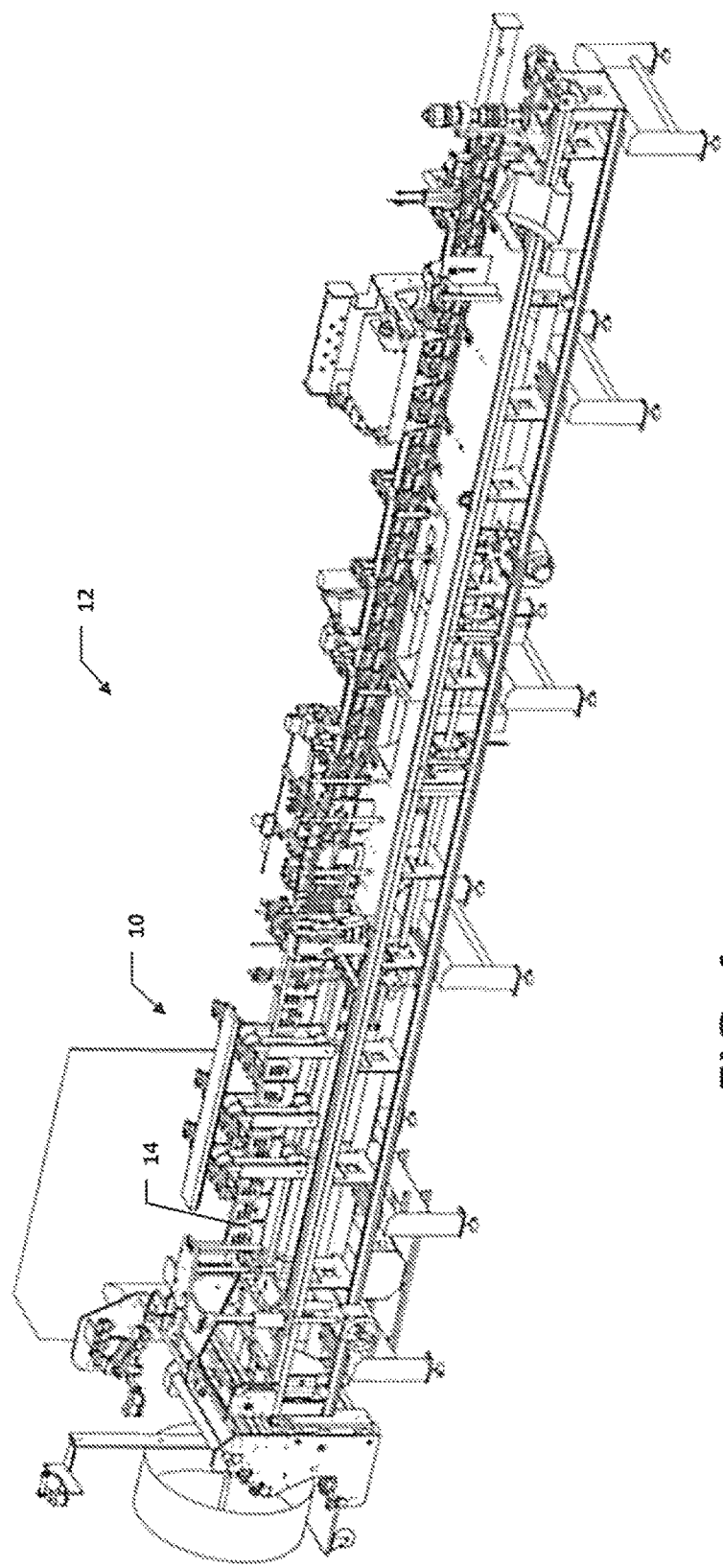
FIG. 1 is a perspective view of a packaging machine including a magnetically operated sealing bar assembly, according to an embodiment of the present invention.

According to an embodiment of the present invention, referring to FIG. 1, a magnetically operated sealing bar assembly 10 is integrated into a packaging machine 12. The packing machine 12, such as the horizontal pouching machine of FIG. 1, feeds a web of packaging material 14 through the sealing bar assembly 10 for the performance of one or more sealing operations. In the depicted embodiment, the sealing bar assembly 10 forms side seals along a vertical sealing axis between adjacent pouches. It will be appreciated, however, the sealing bar assembly 10 is not necessarily limited to use in a vertical orientation, or in a particular type of packaging machine.

Figure 2:
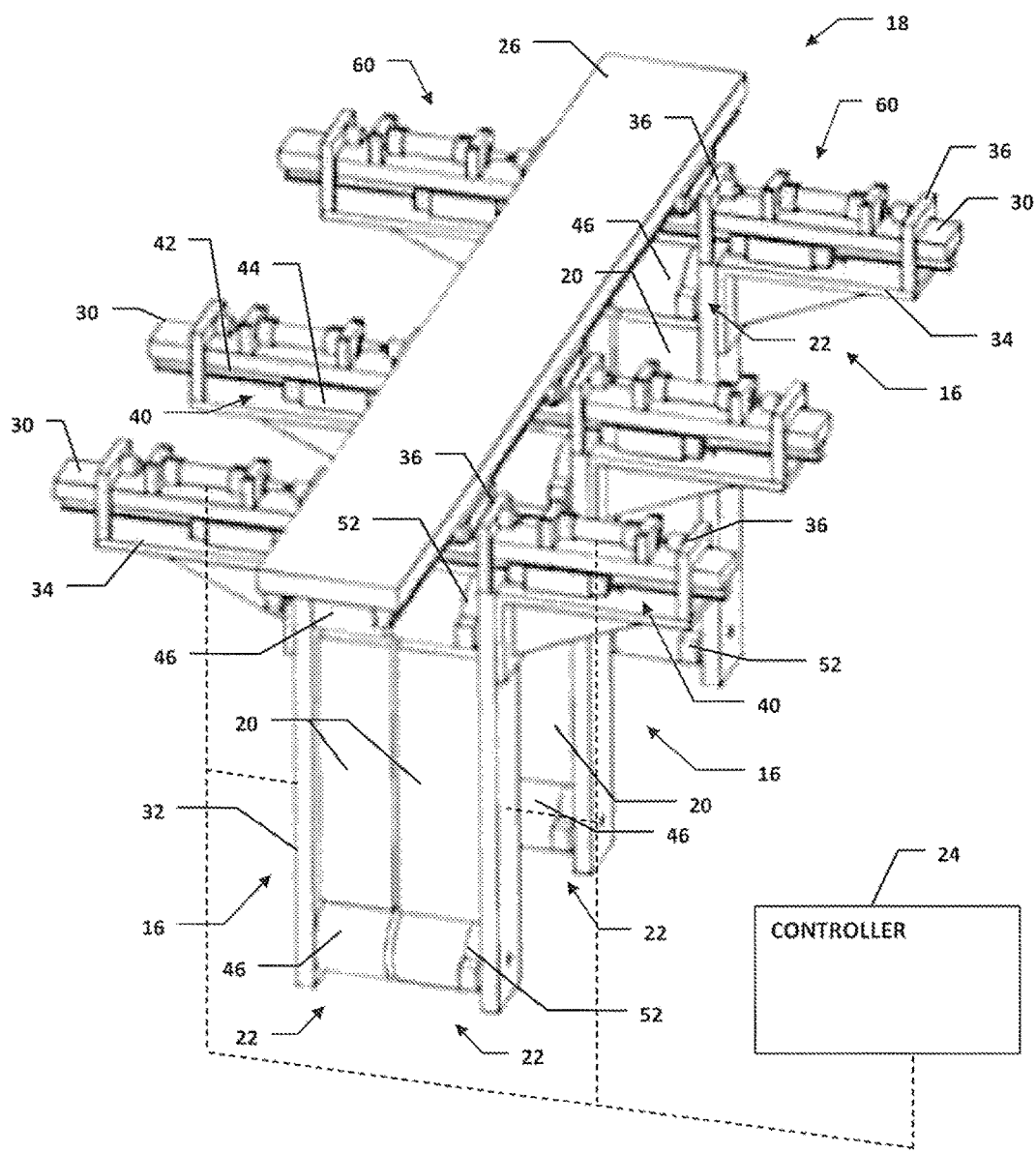
FIG. 2 is a perspective view of the magnetically operated sealing bar assembly of FIG. 1, including a plurality of pairs of magnetically operated sealing bars.
Figure 3:
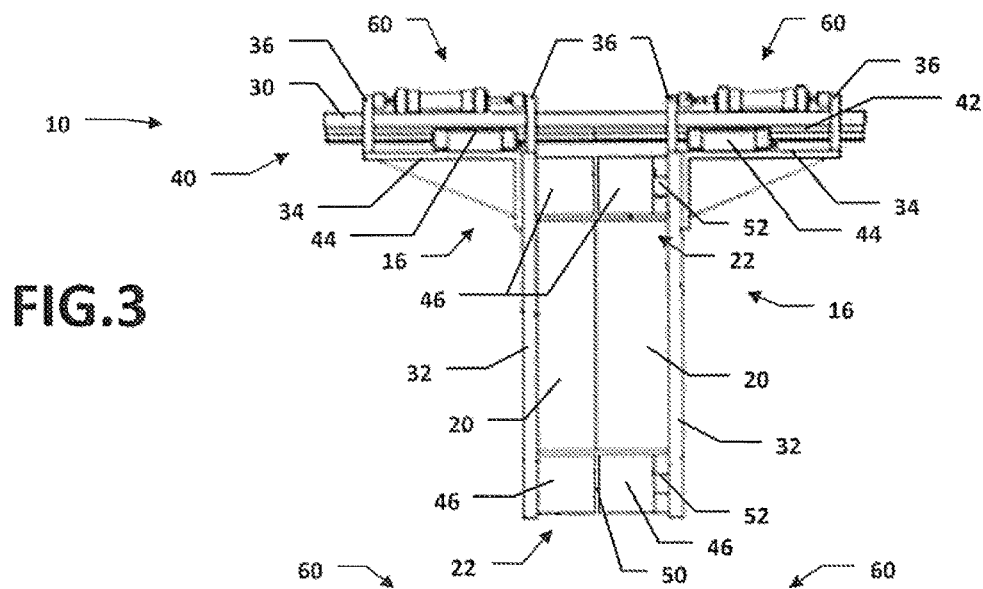
FIG. 3, is an end view of a representative one of the pairs of magnetically operated sealing bars of FIG. 2, in a sealing position.

Referring to FIGS. 2 and 3, the magnetically operated sealing bar assembly 10 includes a plurality of pairs of sealing bar carriages 16 slidably carried on a mounting frame 18, with sealing bars 20 mounted on each of the carriages 16 and electromagnet assemblies 22 arranged adjacent to the sealing bars 20. A controller 24 is in signal communication with the electromagnet assemblies 22. The controller 24 is configured to selectively energize the electromagnet assemblies to move the sealing surfaces of the sealing bars 20 into and out of engagement across the web of packaging material 14 (see FIG. 1).

The mounting frame 18 in the depicted embodiment includes a longitudinal portion 26 spanning multiple pairs of sealing bars 20 and carriages 16, and transverse portions 30 for each of the respective pairs of sealing bars 20 and carriages 16. Generally, the mounting frame will be configured to integrate the sealing bar assembly into a given packaging machine and to hold the sealing bars in appropriate positions for the sealing operations to be undertaken thereby. In some embodiments, the mounting frame can be reconfigurable; for instance, the number of pairs of sealing bars 20 and carriages 16 carried thereon can be adjusted, as well as the spacing therebetween.

Additionally, the necessary relative motion between the sealing bars could be effected if only one sealing bar 20 in each pair were movably mounted, with the other sealing bar remaining stationary. Where both sealing bars are movably mounted, it is also not necessary that both bars move equal distances.

The sealing bar carriages 16 each include a sealing bar mounting portion 32 and a mounting frame attachment portion 34 which, in the depicted embodiment, extend at right angles to form an "L" shape. Two engagement surfaces 36 extend upwardly from the mounting frame attachment portion 34 and help delimit the cycle distance of the carriages 16, as will be explained in greater detail below.

Linear bearing assemblies 40 are used to slidably suspend the sealing bar carriages 16 from the transverse portions 30 of the mounting frame 18. Each assembly 40 includes a mounting rail 42 fixed to the transverse portion 30 and a linear bearing 44 fixed to the mounting frame attachment portion 34 of the sealing bar carriage 16. It will be appreciated that this arrangement of assembly 40 components could be reversed, and that other slidable connection arrangements could be employed. Notably, since the sealing forces are generated by the electromagnet assemblies 22 on the carriages 16, rather than being transferred from a motor or other drive via one or more mechanical linkages connected to the carriages 16, the mounting frame 18, the carriages and any interface therebetween can generally be made of much lighter construction.

While the depicted sealing bar carriages 16 are slidably mounted to the frame 18 via the linear bearing assemblies 40, the present invention could employ other means of effecting the closing and opening motion of one or both sealing bars. For example, translational motion supported by a pantograph-type linkage could be employed. Alternately, sealing bars could be brought together in a pivotal, scissor-like, motion.

Sealing surfaces are formed on the opposing faces of the sealing bars 20. Preferably, the sealing bars 20 are heated, facilitating the formation of a hermetic seal in the packaging material, although sealing bars equipped with additional or alternative features could also be used. For example, sealing bars equipped with cooling means could be used, as well as sealing bars configured to seal fitments into a pouch or other package could be used (e.g., a plastic zipper lock). Generally, the sealing bars 20 are elongated in the direction of the sealing axis (e.g., the vertical axis in the depicted embodiment).

The electromagnet assemblies 22 each include a pair of electromagnets 46, attached to the sealing bar mounting portion 32 of each sealing bar carriage 16 on opposite ends of the sealing bar 20. Preferably, the electromagnets 46 are separated by the sealing bar 20 in the direction of the elongate axis thereof. This arrangement facilitates the application of equal sealing forces along the entirely of the opposed sealing surfaces of each pair of sealing bars 20. Advantageously, the electromagnets 46 are dimensioned such that an air gap 50 remains defined therebetween when the sealing bar surfaces of the sealing bar 20 are engaged across the web of packaging material 14 (i.e., in the FIG. 3 position).

Rather than associating an electromagnet assembly with each sealing bar in a pair, the present invention could incorporate a single electromagnet assembly with one sealing bar that would alternately attract and repulse one or more permanent magnets (e.g., a rare earth magnet, such as neodymium), or magnetizable materials (e.g., a ferrous metal), on the opposite sealing bar.

Via the controller 24, the attractive force and polarity of the electromagnets 46 are adjustable. The opposing electromagnets 46 are advantageously aligned on the respective sealing bar carriages 16 such that attractive forces therebetween automatically align the opposed sealing surfaces of the respective sealing bars 20 when closed.

For each pair of sealing bars 20, at least one of the respective electromagnet assemblies 22 has one or more load cells 52 associated therewith. Most preferably, one of the electromagnet assemblies 22 has a load cell 52 connected to each of the pair of electromagnets 46. The load cells 52 are operable to sense the attractive or repulsive force acting between the electromagnet assemblies 22 and communicate the sensed force to the controller 24.

Figure 4:
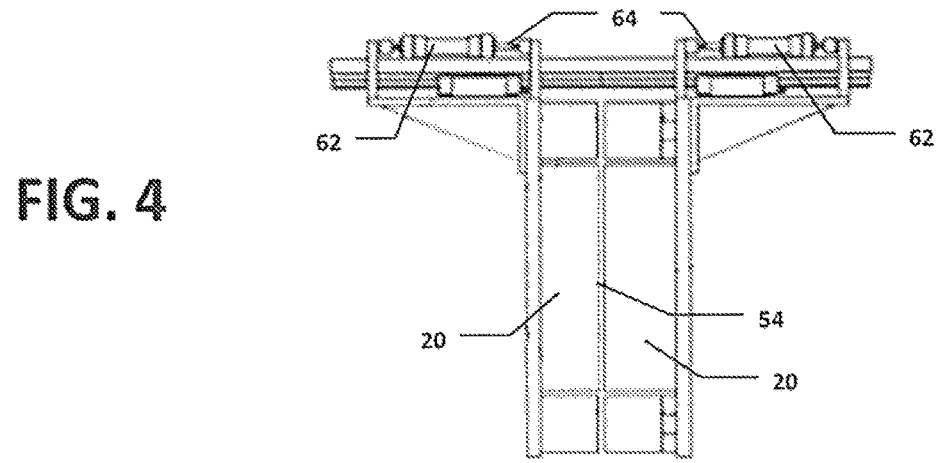
FIG. 4 is an end view of the pair of magnetically operated sealing bars of FIG. 3, in an operational mode open position.
Figure 5:
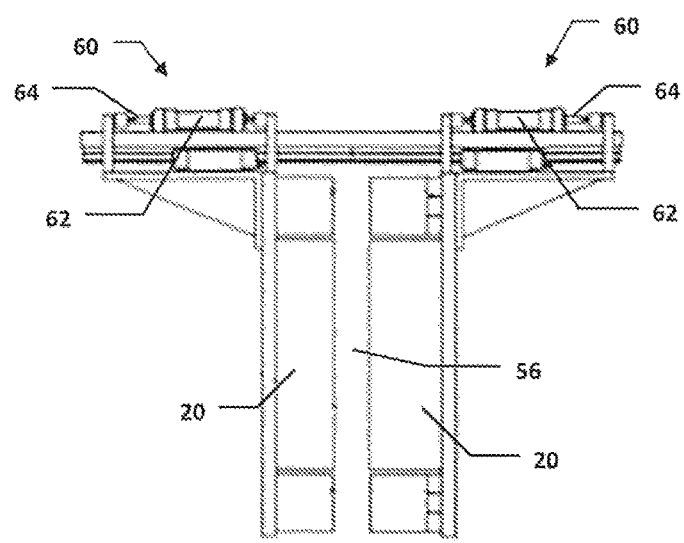
FIG. 5 is an end view of the pair of magnetically operated sealing bars of FIG. 3, in a stop mode open position.

During packaging operations, the sealing bars 20 must typically be cycled repeatedly at a relatively high frequency. To facilitate such fast and reliable operation, the fully open spacing 54 in an operational mode (see FIG. 4) is preferably small. However, in a stop mode, a larger fully open spacing 56 (see FIG. 5) is generally more preferred. For example, in packaging machines employing heated sealing bars 20 to partially melt the packaging material 14 (see FIG. 1), if advancement of the material must be stopped for a prolonged period of time, the minimal separation of the sealing bars 20 in the operational mode fully open spacing 54 may be insufficient to prevent unwanted melting of the packaging material. The larger fully open spacing 56 of the stop mode can mitigate or prevent this problem.

Mode adjustment assemblies 60 are accordingly associated with the sealing bar carriages 16 that are operable to adjust the fully open spacing between the opposed sealing surfaces of the sealing bars 20. Advantageously, the mode adjustment assemblies are operated by the controller 24. In the depicted embodiment, the mode adjustment assemblies 60 each include an actuator 62 mounted to the transverse portions 30 of the mounting frame 18 between the two engagement surfaces 36 of the mounting frame attachment portion 34. Any suitable actuators could be used, including pneumatic, hydraulic or solenoid actuators. A physically separate actuation drive could also be employed, connected to the mode adjustment assemblies 60 via mechanical linkages.

Each actuator 62 includes an operating member 64 located between the engagement surfaces 36; for instance, an operating piston or rod. The interaction of the operating member 64 defines a cycle distance of its sealing bar carriage 16 via interaction with the engagement surfaces 36. For instance, the operating member 64 length can be dimensioned slightly less than the spacing between the engagement surfaces 36 and/or a degree of lateral play can be permitted in the operating member 64. With the operating members 64 shifted inward, as in FIGS. 3 and 4, the operating members 64 limit the outward movement of the sealing bar carriages 16 to set the smaller fully open spacing 54 of the operational mode. With the operating members 64 shifted outward, as in FIG. 5, the operating members 64 essentially urge the carriages 16 outward to establish the larger fully open spacing 56 of the stop mode.

Although the use of a mechanical mode adjustment is believed to represent a preferred embodiment, the controller 24 could also be configured to set the fully open spacing and cycle length directly via control of the energization of the electromagnet assemblies 22. As noted previously, in addition to controlling the energization (including polarity and force) of the electromagnet assemblies 22, the controller 24 is preferably also configured to do so based upon sensed forces received from the load cells 52, and additionally to control the mode adjustment assemblies 60. The present invention is not necessarily limited to any particular controller type, although a programmable digital controller is preferred. Additionally, the controller could be realized as multiple, separate controllers, each performing one or more of the enumerated functions.

From the foregoing, it will be appreciated that an improved sealing bar assembly according to the present invention allows automatic self-alignment of sealing bars during operation, permits a lighter and simpler mounting arrangement for sealing bars, and enables easy and nearly instantaneous adjustment of sealing forces and other sealing parameters—even allowing automatic adjustment during operation based on sensed forces.

The above-described embodiments are provided for illustrative purposes; the present invention is not necessarily limited thereto. Rather, those skilled in the art will appreciate that various modifications, as well as adaptations to particular circumstances, will fall within the scope of the invention herein shown and described, and of the claims appended hereto.

What is claimed is:

1. A sealing bar assembly for a packaging machine comprising:
    a mounting frame;
    first and second sealing bar carriages carried by the mounting frame, at least one of the first and second sealing bars being movable with respect to the mounting frame;
    first and second sealing bars mounted, respectively, to the first and second sealing bar carriages and movable therewith, the first and second bars including, respectively, first and second opposed sealing surfaces;
    at least a first electromagnet assembly carried by the first sealing bar carriage and arranged adjacent to the first sealing bar, the first electromagnet assembly operable to magnetically attract and repel the first and second sealing bars; and
    a controller configured to selectively energize and adjust a polarity of the first electromagnet assembly to move, using magnetic attraction and repulsion, the first and second opposed sealing surfaces into and out of engagement across a web of packaging material passing therebetween.

2. The sealing bar assembly of claim 1, wherein both the first and second sealing bars are movable with respect to the mounting frame.

3. The sealing bar assembly of claim 2, wherein the first and second sealing bars are slidably carried by the mounting frame.

4. The sealing bar assembly of claim 3, further comprising a linear bearing assembly slidably connecting the first and second sealing bar carriages to the mounting frame.

5. The sealing bar assembly of claim 4, wherein the linear bearing assembly includes at least one bearing rail slidably carrying first and second linear bearings, the first and second linear bearings being connected, respectively, to the first and second sealing bar carriages.

6. The sealing bar assembly of claim 4, wherein the first and second sealing bars are oriented vertically and the first and second sealing bar carriages are suspended from the mounting frame by the linear bearing assembly.

7. The sealing bar assembly of claim 4, wherein the linear bearing assembly is the only mechanical support for the first and second sealing bar carriages.

8. The sealing bar assembly of claim 2, further comprising a mode adjustment assembly configured to engage the first and second sealing bar carriages to vary a fully open spacing between the first and second opposed sealing surfaces from an operation mode spacing to a stop mode spacing greater than the operation mode spacing.

9. The sealing bar assembly of claim 8, wherein the mode adjustment assembly includes first and second actuators arranged on the mounting frame and operable to engage, respectively, the first and second and sealing bar carriages.

10. The sealing bar assembly of claim 9, wherein the first and second actuators each include an operating member acting between a respective pair of opposed engagement surfaces of the first and second sealing bar carriages.

11. The sealing bar assembly of claim 10, wherein each operating member defines a cycle distance of each respective one of the first and second sealing bar carriages.

12. The sealing bar assembly of claim 1, further comprising a second electromagnet assembly carried by the first sealing bar carriage and arranged adjacent to the second sealing bar;
    wherein the controller is further configured to selectively energize the second electromagnet assembly to move, using magnetic attraction and repulsion, the first and second opposed sealing surfaces into and out of engagement across the web of packaging material passing therebetween.

13. The sealing bar assembly of claim 12, wherein the first and second electromagnet assemblies include, respectively, first and second pairs of electromagnets.

14. The sealing bar assembly of claim 13, wherein the first and second pairs of electromagnets are mounted such that, with the first and second opposed sealing surfaces engaged across a web of packaging material, there is an air gap between opposed members of the first and second pairs of electromagnets.

15. The sealing bar assembly of claim 12, wherein the first and second pairs of electromagnets are located adjacent opposite ends of the first and second sealing bars.

16. The sealing bar assembly of claim 15, wherein the first and second sealing bars are elongated in a sealing axis direction between their respective opposite ends.

17. The sealing bar assembly of claim 12, further comprising a load cell associated with the first electromagnet assembly and operable to sense a magnetic force generated between the first and second electromagnetic assemblies.

18. The sealing bar assembly of claim 17, wherein the magnetic force sensed by the load cell is communicated to the controller, and the controller is further configured to selectively energize the first and second electromagnet assemblies based thereon.

19. The sealing bar assembly of claim 18, wherein the first and second electromagnet assemblies include, respectively, first and second pairs of electromagnets, the load cell being connected to one member of the first pair of electromagnets and an additional load cell being connected to another member of the first pair of electromagnets, the additional load cell also communicating a sensed magnetic force to the controller.

20. A pouching machine comprising:
    a machine frame along which a film of pouch-forming material is fed in a travel plane;
    a pair of sealing bar carriages supported by the machine frame for reciprocal movement on opposite sides of the travel plane;
    a pair of sealing bars, each of the pair of sealing bars being mounted to a respective one of the pair of sealing bar carriages and having a sealing surface, the sealing surfaces of the pair of sealing bars being opposed across the travel plane;
    a pair of electromagnet assemblies, each of the pair of electromagnet assemblies being carried by a respective one of the pair of sealing bar carriages and arranged adjacent to a respective one of the pair of sealing bars, the pair of electromagnet assemblies being operable to magnetically attract and repel the first and second sealing bars; and a controller configured to selectively energize and adjust a polarity of the pair of electromagnet assemblies to move, using magnetic attraction and repulsion, the sealing surfaces into and out of engagement with the film of pouch-forming material in the travel plane.

21. The pouching machine of claim 20, wherein each of the pair of electromagnet assemblies includes two electromagnets located at opposite longitudinal ends of the respective one of the pair of sealing bars.

22. The pouching machine of claim 21, wherein at least one of the pair of electromagnet assemblies includes two load cells, each of the two load cells being adjacent a respective one of the two electromagnets, each of the two load cells being operable to sense a magnetic force generated between the pair of electromagnet assemblies, and the controller being further configured to selectively energize the pair of electromagnet assemblies based on the magnetic force sensed by the two load cells.

23. The pouching machine of claim 20, further comprising a mode adjustment assembly configured to engage the pair of sealing bar carriages to vary a fully open spacing between the sealing surfaces from an operation mode spacing to a stop mode spacing greater than the operation mode spacing.

* * * * *